United States Patent [19]
Arai

[11] 4,212,474
[45] Jul. 15, 1980

[54] SEAL RING HAVING TAPERED SURFACE AND SEALING DEVICE INCORPORATING THE SAME

[76] Inventor: Yoshio Arai, 1400, Kamihongo, Matsudo-shi, Chiba-ken, Japan

[21] Appl. No.: 44,014

[22] Filed: May 31, 1979

[30] Foreign Application Priority Data

Jun. 30, 1978 [JP] Japan .................................. 53-79380

[51] Int. Cl.² ............................................ F16J 15/34
[52] U.S. Cl. ...................................... 277/83; 277/84; 277/87; 277/93 R; 277/119; 277/144; 277/198
[58] Field of Search ................... 277/40, 41, 81 R, 82, 277/83, 84, 85, 87, 93 R, 93 SD, 95, 117–122, 143–145, 157, 174, 170–172, 190, 192, 198

[56] References Cited

U.S. PATENT DOCUMENTS

| | | | |
|---|---|---|---|
| 743,666 | 11/1903 | Shaffer | 277/122 |
| 1,020,456 | 3/1912 | Simon | 277/120 |
| 1,547,919 | 7/1925 | Huhn | 277/198 X |
| 2,747,903 | 5/1956 | Heinrich | 277/84 X |

FOREIGN PATENT DOCUMENTS

| | | | |
|---|---|---|---|
| 461446 | 6/1928 | Fed. Rep. of Germany | 277/87 |
| 1346683 | 11/1963 | France | 277/143 |
| 21718 | of 1893 | United Kingdom | 277/145 |

*Primary Examiner*—Robert S. Ward, Jr.
*Attorney, Agent, or Firm*—Haseltine, Lake & Waters

[57] ABSTRACT

A seal ring with tapered surfaces is constituted by an inner ring, outer ring and a tightening resilient member. Each of the inner and outer rings is provided with an inner and outer peripheral surfaces and a pair of sealing end surfaces extending between the inner and outer peripheral surfaces. Each of the inner and outer ring is divided in the circumferential direction into two sections. The inner peripheral surface of the outer ring fits the outer peripheral surface of the inner ring, while the outer peripheral surface of the outer ring is surrounded by the resilient member so that the inner and outer rings are resiliently pressed radially inwardly. The end surfaces of the inner and outer rings are arranged flush to form common sealing surfaces. At least one of the common sealing surfaces thus formed constitutes a conical surface so that the axial distance between two common sealing surfaces is varied such that it increases toward the radially outer side. A sealing device is constituted by the seal ring with tapered surfaces having the above-stated construction, and annular surfaces to be sealed which are provided on two members adapted to rotate relatively to each other so as to oppose to each other, the annular surfaces to be sealed forming therebetween an outwardly diverging gap and being adapted to make close contact with the pair of common sealing surfaces of the seal ring. The radially inward pressing force of the resilient member produces an axial sealing force of the seal ring, through relative sliding contact between the conical sealing surface of the seal ring and the annular surface of the aforementioned member contacting therewith.

11 Claims, 4 Drawing Figures

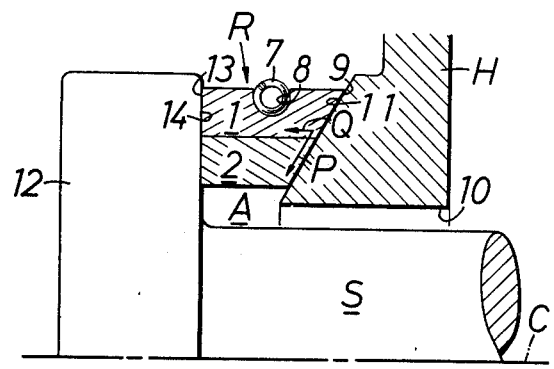
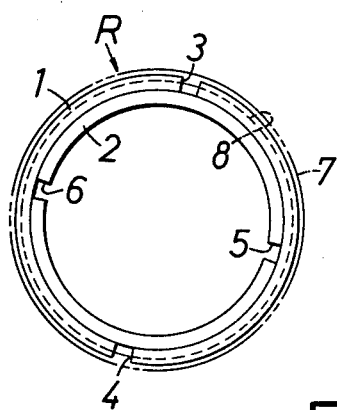
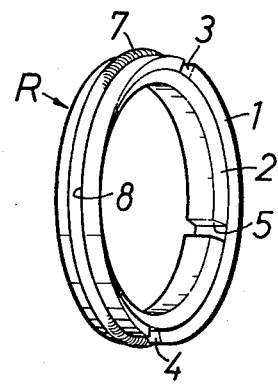
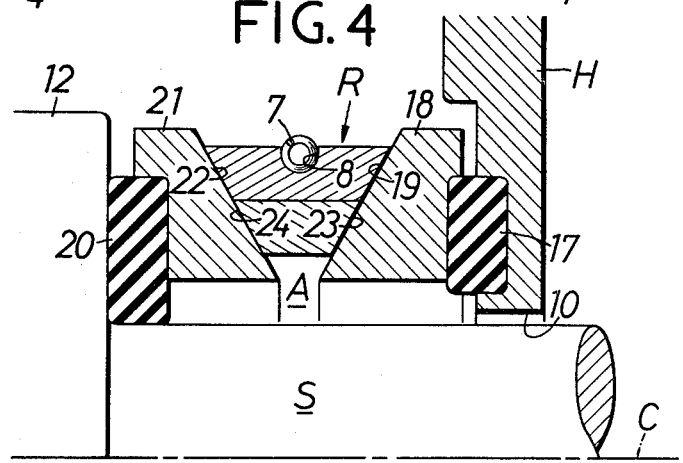

SEAL RING HAVING TAPERED SURFACE AND SEALING DEVICE INCORPORATING THE SAME

BACKGROUND OF THE INVENTION

The present invention relates to a seal ring having tapered surfaces adapted to make a seal between a first and a second members having annular surfaces to be sealed, the annular surfaces being opposed by each other to form therebetween an outwardly diverging annular gap, and also to a sealing device having such a seal ring.

Hitherto, there have been used various types of sealing means for effecting a seal between a pair of members one of which makes a rotation relatively to each other, e.g. a housing and a rotary shaft supported by the housing. The simplest form of such sealing means is a sealing device having an elastic member such as an "O" ring or an oil seal made of rubber or an equivalent elastic material and adapted to make close contact with two members by its elasticity. The sealing device made of rubber or the like elastic material has been broadly used due to its simple construction and good adaptability to the portion requiring the seal. However, due to the characteristic of the elastic material, this type of sealing device cannot be used under severe conditions such as high temperature and/or pressure.

For this reason, a sealing device constituted by metallic rigid member is used in place of the sealing device having a sealing member made of rubber or equivalent material for a seal under a severe condition such as high temperature and/or pressure. In this type of sealing device having a metallic rigid member, the sealing function as performed in the sealing device having a sealing member made of rubber or the like by the flexibility and elasticity of the sealing member itself cannot be expected. Therefore, this type of sealing device inevitably has a complicated construction employing a plurality of parts. Namely, the sealing device having a metallic rigid member must incorporate an elongated spring member or an additional part having a complicated and minute shape and construction and made of rubber or the like elastic member, in order to ensure a good contact of the sealing member with the surface of the rotary member. This inevitably renders the construction of the sealing device complicated to require a high grade technique in the manufacture, resulting in a raised cost of manufacture of the sealing device.

SUMMARY OF THE INVENTION

It is therefore an object of the invention to provide a seal ring having tapered sealing surfaces, as well as a sealing device incorporating such a seal ring, which is suitable for use under a severe condition such as high temperature and/or pressure, and which can be produced without necessitating any specific high-grade technique at a reduced cost.

According to one aspect of the invention, there is provided a seal ring for effecting a seal between a first member and a second member, the first and the second members having annular opposing surfaces to be sealed defining therebetween an outwardly diverging annular gap, the seal ring comprising: an inner ring having an outer and inner peripheral surfaces and both sealing end surfaces adapted to make close contact with the annular surfaces of the first and the second members, the inner ring being devided into two sections in the circumferential direction; an outer ring having an inner peripheral surface adapted to fit the outer peripheral surface of the inner ring, an outer peripheral surface and both sealing end surfaces of the first and second members, the outer ring being also divided into two sections in the circumferential direction at points offset in the circumferential direction from the points where the inner ring is divided into two sections; and a resilient tightening member surrounding the outer peripheral surface of the outer ring to resiliently press the outer and the inner rings radially inwardly.

According to another aspect of the invention there is provided a sealing device comprising a first and a second member having opposing annular surfaces to be sealed defining therebetween an outwardly diverging annular gap; an inner ring having an inner and an outer peripheral surfaces and both sealing end surfaces for making close contact with the annular sealing surfaces of the first and the second members, the inner ring being divided into two sections in the circumferential direction; an outer ring havng an inner peripheral surface fitting the outer peripheral surface of the inner ring, an outer peripheral surface, and both sealing end surfaces for making close contact with the annular surfaces of the first and the second members, the outer ring being also divided into two sections in the circumferential direction at points which are offset in the circumferential direction from the points where the inner ring is divided into two sections; and a tightening resilient member surrounding the outer peripheral surface of the outer ring and resiliently pressing the outer and the inner rings radially inwardly.

BRIEF DESCRIPTION OF THE DRAWINGS

FIG. 1 is a longitudinal sectional view of an essential part of a seal between a housing and a rotary shaft supported by the housing, incorporating a seal ring of the invention having tapered sealing surfaces;

FIG. 2 is a plan view of a seal ring with tapered sealing surfaces embodying the present invention;

FIG. 3 is a perspective view of the seal ring with tapered sealing surfaces as shown in FIG. 2, and FIG. 4 is a longitudinal sectional view of an essential part of the seal ring which is an embodiment different from that shown in FIG. 1, and a sealing device incorporating the seal ring.

DESCRIPTION OF THE PREFERRED EMBODIMENTS

Referring to FIGS. 1, 2 and 3, a seal ring R having tapered sealing surfaces of the invention has an outer ring 1, an inner ring 2 and a coiled spring 7 which constitute a ring-shaped fastening resilient member. Both of the outer and inner rings 1, 2 are made of rigid material which can make a slight resilient or elastic deformation. The inner ring 2 has an inner peripheral surface and an outer peripheral surface and both end surfaces extending between these peripheral surfaces. These end surfaces constitute sealing surfaces. The inner ring is divided into two sections in the circumferential direction at diametrically opposing cut portions 5, 6. Similarly, the outer ring 1 has an inner and outer peripheral surfaces and both sealing end surfaces extending between these peripheral surfaces. The outer ring 1 is also divided into two sections in the circumferential direction at diametrically opposing cut portions 3, 4. A circumferential groove 8 is formed in the outer peripheral surface of the outer ring 1. The endless coiled spring 7 in a stretched condition is received by the groove 8.

In the assembled state, the inner peripheral surface of the outer ring 1 is in close contact with the outer peripheral surface of the inner ring 2. In order to ensure a higher sealing effect, the cut portions 3,4 and the cut portions 5,6 are offset or deviated from each other in the circumferential direction. One of the end surfaces of the outer ring 1 is in flush with the corresponding end surface of the inner ring 2 to form a common sealing end surface 9. Similarly, the other end surface of the outer ring 1 is in flush with the corresponding end surface of the inner ring 2 to form a common sealing end surface 13. The sealing end surface 9 has a conical shape while the sealing end surface is a flat surface normal to the axis of the seal ring. Thus, the seal ring constituted by superposed inner and outer rings as a whole has a trapezoidal cross-section which gradually diverges radially outwardly.

A shaft bore 10 formed in the housing H rotatably receives a rotary shaft S. A flange 12 is formed unitarily with the rotary shaft S at one end of the latter. The inner end surface 14 of the flange 12 constitute a flat surface normal to the axis C of the rotary shaft S. The portion of the housing H around the shaft bore 10 has an enlarged wall thickness. A conical tapered surface 11 is formed on that portion of the housing H to oppose to the inner end surface 14. The conical tapered surface 11 is so tapered that the distance between itself and the inner end surface 14 is gradually increased radially outwardly. Consequently, a radially outwardly diverging annular gap A is formed between the inner end surface 14 of the flange 12 and the conical tapered surface of the housing H.

In order to effect a seal between the rotary shaft S and the housing H, the aforementioned seal ring R is disposed in the annular gap A. The sealing end surfaces 9, 13 of the seal ring R are in close contact with the conical tapered surface 11 of the housing H and the inner end surface 14 of the flange 12 of the rotary shaft S, respectively. Namely, the seal ring R with the tapered sealing surface, shaft bore 10 of the housing H and the rotor shaft S have a common axis line C. The conical apex angle formed between the conical end surface 9 of the seal ring R and the axis line C conicides with the conical apex angle formed between the conical tapered surface 11 of the housing and the axis line C. In this state, the coiled spring 7 exerts radially inward pressing force on the outer peripheral surface of the outer ring 1 uniformly over the entire surface of the latter. This pressing force generates a pressing force against the tapered surface 11, as well as a component P which acts in the direction parallel to the tapered surface 11. The component P in turn generates a component Q which acts in the direction perpendicular to the inner end surface of the flange 12.

Consequently, the seal ring R with tapered surface effectively contacts the flange 12 of the rotary shaft S and, at the same time, the housing H, so as to provide a tight seal between the housing H and the rotary shaft S.

By suitably selecting the distance L between the outer peripheral edge of the tapered surface 11 on the housing and the inner end surface 14 of the flange 12, it is possible to obtain various contact pressures well meeting various conditions of use. Consequently, ideal sealing effect is obtained.

As the rotary shaft S rotates, the outer ring 1 and the inner ring 2 tend to rotate together with the rotary shaft S. In order to prevent this, it is possible to provide an anti-rotation means between the outer and inner rings 1,2 and the housing H.

FIG. 4 shows another embodiment of the invention. This embodiment has a member 18 with a tapered surface 13 fixed through an elastic ring 17 to the portion of the housing H around the shaft bore 10 and another member 21 with a tapered surface 22 which is fixed through an elastic ring 20 to the flange 12 formed on one end of the rotary shaft S. Between the tapered surface 19 of member 18 and the tapered surface 22 of the member 21, interposed is a seal ring R with tapered surfaces, generally having a construction as shown in FIGS. 2 and 3. The seal ring R with tapered surfaces has a pair of conical tapered surfaces 23,24 which make an equal apex angle to the central axis C and are oriented in the opposite directions. One of the conical tapered surface 23 is in uniform contact with the tapered surface 19 of the member 18, while the other conical tapered surface 24 is in uniform contact with the tapered surface 22 of the member 21.

The pairs of members 18 and 21 with tapered surfaces are effective in presenting a pair of tapered surfaces 19,22 to permit the application of the seal ring R between the housing H and the rotary shaft S.

The pair of elastic rings 17 and 20 are effective in resiliently securing the pair of members 18 and 21 with tapered surfaces to the housing H and the rotary shaft S, respectively. The tapered surfaces 23,24 of the seal ring R contact the tapered surfaces 19 and 22 of the members 18,21 at a good affinity to ensure a good sealing effect. The tapered surfaces 23 and 24 of the seal ring R form a radially outwardly diverging annular gap A, and make acute angles to the axis line C in the opposite directions.

Consequently, the radially inward pressing force exerted by the coiled spring 7 stretched around the seal ring R produces axial components which act in the opposite directions, due to the sliding contact between the end surfaces 23,24 and the tapered surfaces 19,22 of the members 18,21. As a result, a quite good sealing effect is obtained despite of the compact and simple sealing construction.

In the seal ring and the sealing device of the invention, the coiled spring stretched around the outer peripheral surface of the outer ring, as the tightening resilient member, can be substituted by a leaf spring adapted to produce a radially inward pressing force or other suitable resilient members. The angles formed between the end surfaces of the inner and outer rings and the central axis can be changed as desired in accordance with the use of the seal ring with tapered surfaces.

What we claim is:

1. A seal ring with at least one tapered surface for use in sealing a space between a first and a second members, the first and the second members having opposing annular surfaces to be sealed defining therebetween an outwardly diverging annular gap, said seal ring comprising: an inner ring having an inner and an outer peripheral surfaces and both sealing end surfaces adapted to make close contact with said annular surfaces of said first and second members, said inner ring being divided in the circumferential direction into two sections; an outer ring having an inner peripheral surface fitted over said outer peripheral surface of said inner ring, an outer peripheral surface, and both sealing end surfaces adapted to make close contact with said annular surfaces of said first and second members, said outer ring being divided in the circumferential direction into two sections at points which are offset in the circumferential direction from the points at which said inner ring is divided into two sections; and a tightening resilient member surrounding said outer peripheral surface of said outer ring and adapted to resiliently press said outer and inner rings radially inwardly.

2. A seal ring as claimed in claim 1, wherein said sealing surfaces of said inner and outer rings at one axial end thereof form a flat surface perpendicular to a common axis line of said inner and outer rings, while said sealing surfaces of said inner and outer rings at the other axial end thereof form a conical surface.

3. A seal ring as claimed in claim 1, wherein said sealing surfaces of said inner and outer rings are constituted by conical surfaces having an equal apex angle relative to the axis line.

4. A seal ring as claimed in claim 1, wherein said tightening resilient member is a coiled spring.

5. A seal ring as claimed in claim 1, wherein said tightening resilient member is a leaf spring.

6. A seal ring as claimed in claim 1, wherein said outer peripheral surface of said outer ring is provided with a circumferential groove for locating said tightening resilient member in place.

7. A seal ring as claimed in claim 1, wherein each of said inner ring and said outer ring is divided into two sections at diametrically opposing points.

8. A sealing device comprising: a first and a second member having opposing annular surfaces to be sealed defining therebetween a radially outwardly diverging annular gap; an inner ring having an inner and an outer peripheral surfaces and opposite sealing end surfaces adapted to make close contact with said annular sealed surfaces of said first and second members, said inner ring being divided in the circumferential direction into two sections; an outer ring having an inner peripheral surface fitted over said outer peripheral surface of said inner ring, an outer peripheral surface, and opposite sealing end surfaces adapted to make close contact with said annular surfaces of said first and second members, said outer ring being divided in the circumferential direction at points which are offset in the circumferential direction from the points at which said inner ring is divided into two sections; and a tightening resilient member surrounding said outer peripheral surface of said outer ring and resiliently pressing said outer and inner rings radially inwardly.

9. A sealing device as claimed in claim 8, wherein said annular surfaces of said first and second members are constituted by conical surfaces which make an equal apex angle to a common axis line of said inner and outer rings.

10. A sealing device as claimed in claim 9, wherein said first and second members are a housing and a rotary shaft supported by said housing, respectively.

11. A sealing device as claimed in claim 10, wherein said conical surface of said first member is secured to said housing through an elastic member, while said conical surface of said second member is secured to said rotary shaft through another elastic member.

* * * * *